United States Patent [19]

Cerny, Jr. et al.

[11] Patent Number: 4,887,420
[45] Date of Patent: Dec. 19, 1989

[54] MODULAR MOWER DECK WITH LIGHT-WEIGHT HOUSING

[75] Inventors: John R. Cerny, Jr., Bettendorf, Iowa; Jay H. Olson, Moline, Ill.; James W. Hall, Bettendorf, Iowa; Leon P. Erdman, Beaver Dam, Wis.

[73] Assignee: Deere & Company, Moline, Ill.

[21] Appl. No.: 264,414

[22] Filed: Oct. 31, 1988

[51] Int. Cl.⁴ .............................................. A01D 34/66
[52] U.S. Cl. .................................... 56/320.2; 56/320.1
[58] Field of Search ..................... 56/11.1, 11.6, 13.6, 56/15.8, 15.9, 320.1, 320.2, DIG. 22

[56] References Cited

U.S. PATENT DOCUMENTS

| | | | |
|---|---|---|---|
| 2,891,370 | 6/1959 | Musgrave | 56/13.6 X |
| 2,962,854 | 12/1960 | Jepson | 56/11.1 |
| 2,983,096 | 5/1961 | Phelps | 56/320.2 X |
| 3,263,406 | 8/1966 | Hanson et al. | 56/11.6 |
| 3,901,003 | 8/1975 | Erdman | 56/320.1 X |
| 4,064,680 | 12/1977 | Fleigle | 56/320.2 X |
| 4,194,345 | 3/1980 | Pioch et al. | 56/360.2 X |
| 4,711,077 | 12/1987 | Kutsukake et al. | 56/320.2 |
| 4,724,660 | 2/1988 | Bowie et al. | 56/320.1 X |

FOREIGN PATENT DOCUMENTS

| | | | |
|---|---|---|---|
| 2519842 | 11/1976 | Fed. Rep. of Germany | 56/320.1 |
| 904081 | 8/1962 | United Kingdom | 56/320.1 |

Primary Examiner—George A. Suchfield

[57] ABSTRACT

A mower deck assembly including a unitary housing with an upper, dome-shaped portion is fabricated from a plastic or laminate material. A modular drive including blade spindles and a belt drive is assembled onto a rigid flat metal suppport plate, and the plate is lifted into position within the housing with the drive received within the dome shaped portion. The support plate is fastened to the housing, and is isolated therefrom with elastomeric material to reduce noise and vibration and seal out dust. The dome-shaped portion and the plate define a drive housing which encloses the drive and protects the spindles and belt drive from the environment. The plastic or laminate material can be easily and inexpensively formed to provide the curved surfaces and the like for the housing with the loading being absorbed by the metal support plate.

24 Claims, 2 Drawing Sheets

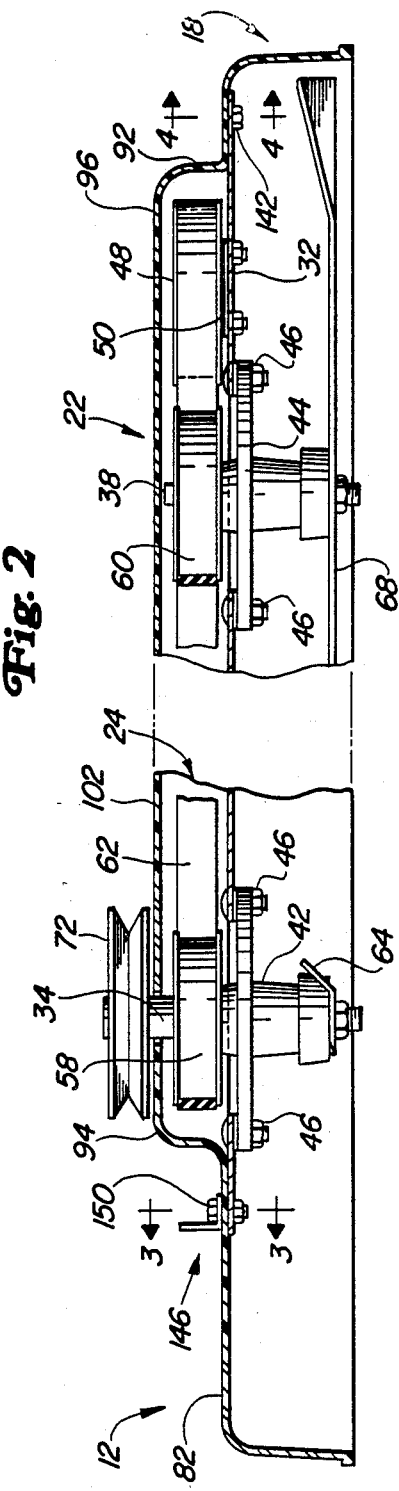
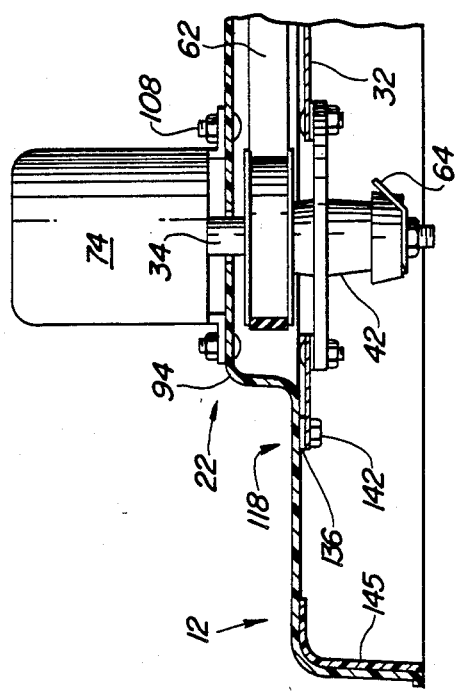
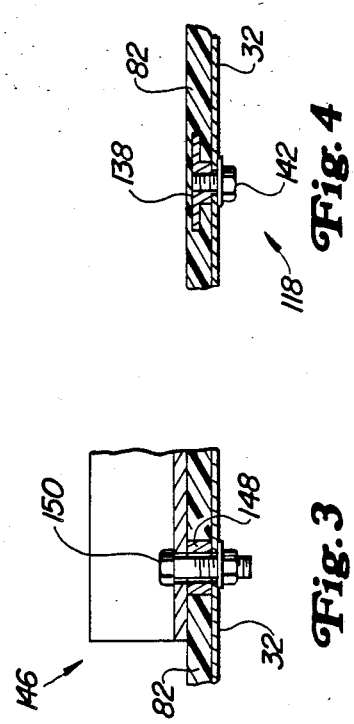
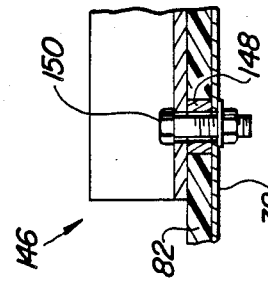

MODULAR MOWER DECK WITH LIGHT-WEIGHT HOUSING

BACKGROUND OF THE INVENTION

The present invention relates generally to mowers, and more specifically to an improved mower deck construction for supporting rotating cutting blades and drive components therefor.

Current mower decks are fabricated from steel and are heavy, expensive and noisy. Although some push mower decks have been manufactured from injection molded thermoplastics, the structural integrity of the decks has not always been as good as desired. It has heretofore been a problem to provide adequate strength in the deck, particularly in the area of the drives and blade spindles, when utilizing other than a metal assembly, and attempts to strengthen a molded plastic or laminate part to take the maximum desired loading requires expensive molding techniques such as providing a double wall arrangement with foam cores. Driving two or more spindles in a single deck increases load problems.

Fabricating present-day decks with drives and blade spindles is often relatively labor intensive. Various components must be assembled from opposite sides of the deck so that the deck has to be handled and turned at various times during assembly. A large number of parts are usually required for present assemblies.

Another disadvantage of present day mower decks is the exposure of the belts and drives to the hostile environment around the mower blades which can result in the buildup of debris in the drive belt area and ultimately result in drive failure. Also, some belt and drive components may be exposed and subject to contact. The exposed belts and drive components are also not aesthetically pleasing.

BRIEF SUMMARY OF THE INVENTION

It is therefore an object of the present invention to provide an improved mower deck arrangement which overcomes many of the above-mentioned problems. It is a further object to provide such an arrangement which advantageously utilizes plastics, laminates or composites or similar materials.

It is yet another object to provide an improved mower deck arrangement which is lighter and less costly to manufacture and which reduces noise and vibration. It is a further object to provide such a structure which retains adequate load strength. It is still another object to provide such an arrangement which supports at least two driven blade spindles and yet utilizes light-weight plastic or composite materials or the like.

It is still a further object of the present invention to provide an improved mower deck arrangement which is easier and more quickly assembled than most previously available arrangements. It is a further object to provide such an arrangement wherein the drives and blade spindle mountings may first be assembled into a module which is then connected to the mower deck. It is still a further object to provide such a modular arrangement wherein assembly is in a single axial direction to reduce handling and turning of the components for ease of production. It is yet another object to provide such an arrangement having fewer parts than at least most other deck structures.

It is still a further object of the present invention to provide an improved mower deck arrangement which provides increased drive protection and reduces the exposure of drive components. It is a further object to provide such an arrangement which is aesthetically more pleasing than most previously available mower deck arrangements.

It is still another object of the present invention to provide an improved mower deck arrangement which includes a deck made of light-weight plastic, laminate or composite material or the like with a raised or dome-shaped portion which acts as a structural reinforcement and also as a drive shield structure. It is a further object to provide such an arrangement wherein the blade spindle or spindles and drives are mounted on a metal plate which in turn is connected to the light-weight deck for improved drive component support, load resistance and ease of assembly. It is still another object to provide an improved method for fabricating such a mower deck.

In accordance with the above objects, a mower deck assembly for a blade mower includes a unitary housing fabricated from a light-weight material and having a domed upper portion forming a downwardly opening cavity within the housing. A modular mounting platform or plate, which supports the drive pulleys and spindle or spindles and the corresponding drive components such as the drive belts, is connected by fasteners to the inside of the housing below the domed upper portion. The plate not only substantially bears all the loading of the drive and spindle or spindles, but it also closes the lower portion of the dome to define an enclosure which protects the drive and the belts and which removes the drive arrangement from view. The modular platform can be simply installed from one direction into the housing to facilitate assembly of the deck arrangement. Therefore, a plastic, composite, laminated or other light-weight material may be used where it can be economically formed, for example, for curved surfaces, while the plate provides ample support for the blade and drive loadings and for the deck mount for attaching the mower deck to the vehicle. The substantially enclosed drive compartment also protects the components from debris buildup and increases life of the belts, pulleys and spindles. The operator is not exposed to any moving belts or pulleys.

These and other objects, features and advantages of the present invention will become apparent to those skilled in the art from the description which follows and from the drawings.

BRIEF DESCRIPTION OF THE DRAWINGS

FIG. 2 is an enlarged sectional view of the deck assembly of FIG. 1 in assembled condition.

FIG. 3 is a sectional view of the deck support bracket taken essentially along lines 3—3 of FIG. 2.

FIG. 4 is a sectional view of the plate fastener taken essentially along lines 4—4 of FIG. 2.

FIG. 5 is a view of the drive end of the housing with an electric motor attached to the dome-shaped portion.

DESCRIPTION OF THE PREFERRED EMBODIMENT

Figure 1:
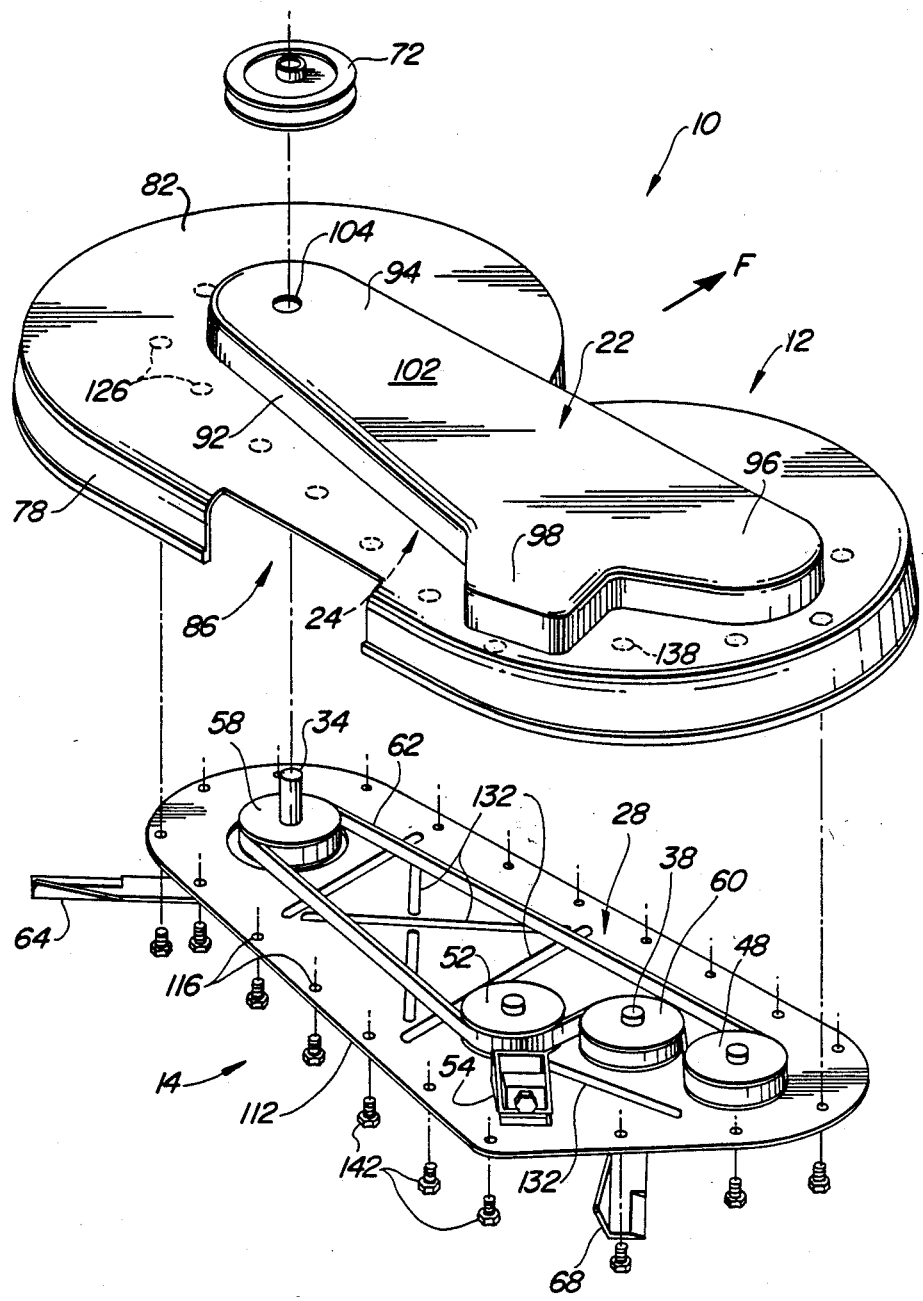
FIG. 1 is an exploded view of the mower blade deck assembly.

Referring to the figures, therein is shown a mower blade deck assembly indicated generally at 10 for a blade mower. The deck assembly 10 includes an upper housing 12 and a modular drive assembly 14. The upper housing 12 is fabricated from a light-weight material, and includes a lower blade housing 18 and an upper raised or dome-shaped portion 22. The dome-shaped portion 22 defines a generally downwardly opening cavity indicated at 24 within the upper housing 12.

The modular drive assembly 14 includes drive structure indicated generally at 28 carried on the upper side of a support plate 32. The drive structure 28 as shown in FIG. 1 includes first and second spaced blade spindles 34 and 38 journalled for rotation about upright axes generally perpendicular to the plan of the support plate 32 in spindle housings 42 and 44, respectively (FIG. 2). The spindle housings 42 and 44 are fixed to the plate 32 by bolts 46. An idler pulley 48 is connected to the plate 32 by a mounting bracket 50 and is journalled for rotation about an upright axis outwardly of the second blade spindle 38. An adjustable idler 52 is connected by an idler support 54 to the support plate 32 for rotation about an upright axis on the opposite side of the blade spindle 38. A pulley 58 is fixed for rotation with the blade spindle 34. A drive belt 62 is trained around the pulley 58, adjustable idler 52 and idler pulley 48, and as best seen in FIG. 1, curves around the back side of a pulley 60 fixed to the blade spindle 38. The blade spindles 34 and 38 are thus rotated in opposite directions.

The spindles 34 and 38 project downwardly through the plate 32, and mower blades 64 and 68 are fixed to the lower ends of the respective spindles for rotation therewith in counterrotating fashion. Preferably, the blades 64 and 68 are timed to rotate ninety degrees out of phase with each other. Drive to the structure 28 may be provided either through a drive pulley 72 fixed to the upper end of the blade spindle 34 and connected to a belt drive (not shown), or by a motor 74 (FIG. 5) directly attached to the dome-shaped portion 22 and drivingly connected to the blade spindle 34.

As can best be appreciated from FIG. 1, the drive structure 28 is entirely contained on the support plate 32 of the modular drive assembly 14. The upper dome-shaped portion 22 is configured to receive the drive structure 28 within the cavity 24 when the plate 32 is attached to the lower side of the housing 18.

The lower blade housing 18 includes an outer curved periphery 78 extending upwardly to a horizontally disposed top portion 82 which extends inwardly from the periphery 78 to the dome-shaped portion 22. The periphery 78 is interrupted at location 86 to form a rearwardly opening discharge area at the center of the housing. The opening 86 is generally rectangular in configuration and extends downwardly from the top portion 82 to the lower edge of the blade housing 18. The counterrotating blades 64 and 68 direct cut material rearwardly through the opening 86.

The dome-shaped portion 22 includes an upright periphery 92 which generally conforms to the shape of the drive structure 28. The upper portion 22 includes a drive end indicated at 94 which houses the area around the pulley 58. The upper portion 22 also includes a driven end indicated generally at 96 which houses the area around the idler pulley 48 and the blade spindle pulley 60. A rearwardly extending leg 98 houses the area around the adjustable idler 52. A horizontal top portion 102 substantially closes the dome-shaped portion 22, with the exception of the opening 104 for receiving the end of a shaft or the spindle 34 for mounting the drive pulley 72 (FIG. 1) when a belt drive arrangement is utilized.

The upper portion 22 extends over a substantial portion of the top 82 and provides additional overall stiffness to the housing 12. In addition, the horizontal top portion 102 provides a mounting surface for an electric motor (74 of FIG. 5) at the end 94 when an electric drive is utilized with the assembly 10. The motor 74 is connected to the top portion 102 by fasteners 108. The deck assembly 10 is assembled by simply raising the module 14 into the housing 12 with the drive structure 28 being received within the downwardly opening cavity 24. The support plate 32 has a periphery 112 generally following but larger than the periphery 92 of the upper dome-shaped portion 22. The module 14 is lifted into the housing 12 until the top of the plate 32 rests against the bottom of the blade housing top portion 82. The plate 32 is apertured at 116 adjacent the periphery 112 and receives fasteners, indicated generally at 118 (FIG. 4), which extend up through the apertures 116 and are secured to the top portion 82 at locations 126 (FIG. 1) outwardly adjacent the periphery 92 of the upper portion 22.

Preferably, the support plate 32 is fabricated from steel and includes strengthening ribs 132. The support plate 32 hit a stake or stump during operation, the loading will be absorbed by the steel plate 32, and the housing 12 will be protected from the load. Therefore, the housing 12 may be fabricated from plastic, composites or similar materials so that it can be economically formed with the curved surfaces to provide the desired shape of the lower blade housing 18 and the upper dome-shaped portion 22. An elastomeric spacer 136 (FIG. 5) can be placed between the steel plate 32 and the composite housing 12 to isolate the drive structure 28 from the deck to thereby reduce noise generation. The spacer 136 will also reduce fatigue caused by assembling steel and plastic or composite components together which have different physical properties such as modulus and elasticity. Alternatively, the housing 12 may be fabricated from a composite including a plastic composite structure shell with a rubber lining to improve abrasion resistance and reduce noise and vibration. Preferably, the upper housing 12 is molded or stamped using a single wall construction throughout to reduce manufacturing costs. If a laminate material is utilized, the wall sections may be increased to provide the necessary thickness.

As shown in FIG. 4, the fasteners 118 include T-threaded inserts 138 molded directly into the plastic or laminate material at the locations 126. The inserts 138 open downwardly under the lower blade housing 18 and receive cap screws 142 inserted through the apertures at 116 in the plate 32. Once the plate 32 is secured to the top 82, the cavity 24 of the dome-shaped portion 22 is substantially sealed against dirt and debris that is very prevalent during mowing operations. Therefore, the drive structure 28 is protected against debris buildup that could otherwise clog the drive and lead to premature failure. The shield for the drive structure 28 is formed integrally in the plastic or laminate material and not only shields the drive components but provides necessary stiffness to the upper housing 12. Preferably, the housing 12 is fabricated from a composite, thermoplastic or thermoset material that is light in weight and can either be molded or stamped easily and inexpensively. If additional abrasion resistance is desired on the inside of the lower blade housing 18, a liner 145 (FIG. 5) can be mechanically fastened or glued to the laminate, or one ply of an aramid veil mat can be molded into the blade housing 18. Molding or stamping the housing from the plastic or laminate material results in a pleasing aesthetic design with smooth lines and a minimum of clutter.

To attach the mower blade deck assembly 10 to a vehicle, deck support brackets 146 (FIGS. 2 and 3) are mechanically fastened to the steel plate 32 through the housing 12. Spacer bushings 148 are inserted between the bracket 146 and the steel mounting plate 32 to provide the necessary compressive strength for mounting bolts 150. Tieing the deck support brackets 146 directly to the steel plate 32 provides a strong mounting arrangement without need to reinforce the housing material.

As shown in the embodiment of FIG. 5, the electric motor 74 is secured to the top portion 102 of the dome-shaped portion 22 at the drive end 94. The blade spindle 34 projects upwardly through the opening 104, and the motor mounting substantially seals the top of the dome-shaped portion 22. Alternatively, the pulley 72 as shown in FIG. 1 may be provided which extends above the top portion 102 of the dome-shaped portion 22 and is connected by a drive belt (not shown) which in turn is driven by the motor on the vehicle.

Having described the preferred embodiment, it will be apparent that modifications can be made without departing from the scope of the invention as defined in the accompanying claims.

We claim:

1. A mower deck assembly for a blade mower comprising:
    a unitary housing fabricated from a plastic or laminate material, said housing including a domed upper portion forming a downwardly opening cavity within the housing, and an upper deck portion extending outwardly from the lower portion of the domed portion;
    a rigid support plate;
    a blade drive including a spindle assembly adapted for receiving the mower blade, and means for connecting the blade drive to the rigid support plate for support of the blade drive substantially entirely by the support plate; and
    means for attaching the support plate, with the blade drive connected thereto, to the housing adjacent the lower portion of the domed portion with the blade drive extending upwardly into the cavity.

2. The invention as set forth in claim 1 wherein the support member, when attached to the housing, substantially closes the lower portion of the cavity with the domed upper portion forming a blade drive enclosure.

3. The invention as set forth in claim 1 wherein the blade drive includes at least two spindle assemblies and drive means connecting the spindle assemblies for rotation of the blades together.

4. The invention as set forth in claim 3 wherein the drive means comprises belt pulleys and a belt trained around the pulleys.

5. A mower deck assembly for a blade mower comprising:
    a unitary housing fabricated from a plastic or laminate material, said housing including a domed upper portion forming a downwardly opening cavity within the housing, and as upper deck portion extending outwardly from the lower portion of the domed portion;
    a support member;
    a blade drive including a spindle assembly adapted for receiving the mower blade, and means connecting the blade drive to the support member;
    means for attaching the support member, with the blade drive connected thereto, to the housing adjacent the lower portion of the domed portion with the blade drive extending upwardly into the cavity; and
    wherein the upper deck portion is generally planar and the support member comprises a flat, rigid plate, and the means for attaching the support member comprises fastener means for securing the plate to the upper deck portion.

6. The invention as set forth in claim 5 wherein the plate is fabricated from metal.

7. The invention as set forth in claim 5 further including spacer means located between the plate and the housing for reducing noise generation.

8. The invention as set forth in claim 5 further including a deck support bracket fastened to the rigid plate.

9. A mower deck assembly for a blade mower comprising:
    a unitary housing fabricated from a plastic or laminate material and including a domed upper portion forming a downwardly opening cavity within the housing;
    a support member comprising a rigid plate;
    a blade drive including a spindle assembly adapted for receiving the mower blade, and means connecting the blade drive to the support member;
    means for attaching the support member, with the blade drive connected thereto, to the housing with the blade drive located within the cavity including fastener means for securing the plate to the housing adjacent the domed upper portion; and
    wherein the housing includes an upper deck portion extending outwardly from the lower portion of the domed portion, and the plate is attached to the upper deck portion.

10. A mower deck assembly for a blade mower comprising:
    a unitary housing fabricated from a plastic or laminate material and including a domed upper portion forming a downwardly opening cavity within the housing;
    a support member comprising a rigid plate;
    a blade drive including a spindle assembly adapted for receiving the mower blade, and means connecting the blade drive to the support member;
    means for attaching the support member, with the blade drive connected thereto, to the housing with the blade drive located within the cavity including fastener means for securing the plate to the housing adjacent the domed upper portion; and
    wherein the fastener means comprises internally threaded inserts molded into the housing material and fasteners extending through the plate and threaded into the inserts.

11. A mower deck assembly for a blade mower, comprising:
    a one-piece housing including a flat upper deck portion and a raised portion extending upwardly from the flat deck portion to form a downwardly opening cavity within the housing;
    a modular drive assembly including a drive support plate, a spindle for receiving the mower blade and a drive pulley rotatably mounted on the plate; and means for supporting the drive assembly within the housing with the drive pulley and spindle located within the cavity.

12. The invention as set forth in claim 11 wherein the lower portion of the cavity is substantially closed by the support plate to form therewith a shield for the spindle and drive pulley.

13. The invention as set forth in claim 11 wherein the housing is fabricated from a plastic or laminate material and the drive support plate absorbs substantially all the loading on the drive assembly.

14. The invention as set forth in claim 13 wherein the support plate comprises a flat metal plate, and the means for supporting the drive assembly includes fastener means for securing the plate to the flat upper deck portion within the housing.

15. The invention as set forth in claim 13 wherein the modular drive assembly further includes a second spindle spaced from the first spindle and drive means connecting the spindles for rotation together.

16. The invention as set forth in claim 15 wherein the modular drive assembly is fully assembled on the plate prior to securing the plate to the upper deck portion, and wherein the fully assembled modular drive assembly is received by movement of the plate upwardly under the housing.

17. The invention as set forth in claim 13 including fastener receiving members fabricated into the housing material, and the means for supporting the drive assembly includes fasteners extending from the support plate into the fastener receiving members.

18. The invention as set forth in claim 17 wherein the fastener receiving members are located in the upper deck portion around the periphery of the raised portion.

19. The invention as set forth in claim 13 including a mower deck mount located above the housing, and means for securing the deck mount to the drive support plate.

20. The invention as set forth in claim 13 wherein the material comprises a plastic with an abrasion resistant and noise reducing liner.

21. The invention as set forth in claim 20 wherein the material comprises a one-piece integrated composite.

22. A method of fabricating a mower deck for a blade mower including the steps of:
(a) forming a light-weight housing having a raised upper portion defining a downwardly opening cavity and an upper deck portion extending outwardly from the upper portion;
(b) fabricating a modular blade drive assembly including mounting a blade spindle and a blade drive on a rigid plate member.

23. The invention as set forth in claim 22 including substantially sealing the cavity with the plate member to protect the blade spindle and blade drive from the environment.

24. The invention as set forth in claim 22 wherein the step of forming a light-weight housing includes providing fastener structure in the housing, and the step of securing includes connecting the plate member to the housing with the fastener structure.

* * * * *

UNITED STATES PATENT AND TRADEMARK OFFICE
CERTIFICATE OF CORRECTION

PATENT NO. : 4,887,420

DATED : 19 December 1989

INVENTOR(S) : John Robert Cerny, Jr. et al

It is certified that error appears in the above-identified patent and that said Letters Patent is hereby corrected as shown below:

On the title page, item [75]
Add Applicant Ronald E. Rohren, Moline, IL.

Column 8, line 22, insert --

(c) positioning the blade drive assembly in the housing with the blade spindle and blade drive projecting into the cavity; and (d) securing the blade drive assembly to the housing, the step of securing including connecting the rigid plate member to the upper deck portion.

Signed and Sealed this

Ninth Day of April, 1991

*Attest:*

HARRY F. MANBECK, JR.

*Attesting Officer*         *Commissioner of Patents and Trademarks*